United States Patent
Wang et al.

(10) Patent No.: US 11,876,990 B2
(45) Date of Patent: Jan. 16, 2024

(54) VIDEO RESIDUAL DECODING APPARATUS USING STORAGE DEVICE TO STORE SIDE INFORMATION AND/OR STATE INFORMATION FOR SYNTAX ELEMENT DECODING OPTIMIZATION AND ASSOCIATED METHOD

(71) Applicant: MEDIATEK INC., Hsin-Chu (TW)

(72) Inventors: Sheng-Jen Wang, Hsinchu (TW); Ming-Long Wu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 103 days.

(21) Appl. No.: 17/571,566

(22) Filed: Jan. 10, 2022

(65) Prior Publication Data
US 2023/0024545 A1    Jan. 26, 2023

Related U.S. Application Data

(60) Provisional application No. 63/221,046, filed on Jul. 13, 2021.

(51) Int. Cl.
*H04N 19/423* (2014.01)
*H04N 19/70* (2014.01)
*H04N 19/176* (2014.01)
*H04N 19/129* (2014.01)
*H04N 19/60* (2014.01)
(Continued)

(52) U.S. Cl.
CPC ......... *H04N 19/423* (2014.11); *H04N 19/119* (2014.11); *H04N 19/124* (2014.11); *H04N 19/129* (2014.11); *H04N 19/176* (2014.11); *H04N 19/60* (2014.11); *H04N 19/70* (2014.11)

(58) Field of Classification Search
CPC .. H04N 19/423; H04N 19/119; H04N 19/124; H04N 19/129; H04N 19/176; H04N 19/60; H04N 19/70
See application file for complete search history.

(56) References Cited

U.S. PATENT DOCUMENTS

| | | | |
|---|---|---|---|
| 2006/0146938 A1 | 7/2006 | Bjontegaard | |
| 2013/0272424 A1* | 10/2013 | Sole Rojals | H04N 19/129 375/240.18 |
| 2017/0134751 A1 | 5/2017 | Ström | |

(Continued)

FOREIGN PATENT DOCUMENTS

TW    202046719 A    12/2020

*Primary Examiner* — Jae N Noh
(74) *Attorney, Agent, or Firm* — Winston Hsu

(57) ABSTRACT

A video residual decoding apparatus is used for applying residual decoding to a transform block that is divided into sub-blocks, and includes a residual decoding circuit and a storage device. The residual decoding circuit enters a coefficient loop for decoding one or more syntax elements at each of coefficient positions within a sub-block that has at least one non-zero coefficient level. The coefficient loop includes one decoding pass and at least one other decoding pass. During the at least one other decoding pass, the residual decoding circuit records side information in the storage device, where the side information is indicative of specific coefficient positions at which specific syntax elements need to be decoded in the one decoding pass. During the one decoding pass, the residual decoding circuit refers to the side information for decoding the specific syntax elements at the specific coefficient positions, respectively.

20 Claims, 7 Drawing Sheets

(51) Int. Cl.
*H04N 19/124* (2014.01)
*H04N 19/119* (2014.01)

(56) References Cited

U.S. PATENT DOCUMENTS

2021/0168369 A1 6/2021 Li
2021/0250586 A1* 8/2021 Sole Rojals ........... H04N 19/61

* cited by examiner

VIDEO RESIDUAL DECODING APPARATUS USING STORAGE DEVICE TO STORE SIDE INFORMATION AND/OR STATE INFORMATION FOR SYNTAX ELEMENT DECODING OPTIMIZATION AND ASSOCIATED METHOD

CROSS REFERENCE TO RELATED APPLICATIONS

This application claims the benefit of U.S. provisional application No. 63/221,046, filed on Jul. 13, 2021 and incorporated herein by reference.

BACKGROUND

The present invention relates to a video decoder design, and more particularly, to a video residual decoding apparatus using a storage device to store side information and/or state information for syntax element decoding optimization and an associated method.

The Versatile Video Coding (VVC) standard (also known as H.266 standard) is the most recent video coding standard. The primary objective of the new VVC standard is to provide a significant increase in compression capability compared to its predecessor, the High Efficiency Video Coding (HEVC) standard (also known as H. 265 standard). At the same time, VVC includes design features that make it suitable for a broad range of video applications. The VVC standard employs a multi-pass residual decoding flow for decoding one or more syntax elements at each coefficient position within one decoding unit. In a conventional VVC decoder design, no matter whether a coefficient position needs decoding of a syntax element or not, one decoding pass still traverses the coefficient position within the decoding unit. Furthermore, in a conventional VVC decoder design, quantization-related information calculated by one or more prior decoding passes is re-calculated by a later decoding pass. Thus, there is a need for an innovative residual decoding design with less computation.

SUMMARY

One of the objectives of the claimed invention is to provide a video residual decoding apparatus using a storage device to store side information and/or state information for syntax element decoding optimization and an associated method.

According to a first aspect of the present invention, an exemplary video residual decoding apparatus is disclosed. The exemplary video residual decoding apparatus is used for applying residual decoding to a transform block that is divided into sub-blocks, and includes a residual decoding circuit and a storage device. The residual decoding circuit is arranged to enter a coefficient loop for decoding one or more syntax elements at each of coefficient positions within a sub-block that has at least one non-zero coefficient level, wherein the sub-block is included in the transform block, and the coefficient loop comprises a plurality of decoding passes that are arranged to operate in sequence, and the plurality of decoding passes comprise one decoding pass and at least one other decoding pass. During the at least one other decoding pass, the residual decoding circuit is arranged to record side information in the storage device, where the side information is indicative of specific coefficient positions at which specific syntax elements need to be decoded in the one decoding pass. During the one decoding pass, the residual decoding circuit is arranged to refer to the side information recorded in the storage device for selecting the specific coefficient positions within the sub-block and decoding the specific syntax elements at the specific coefficient positions.

According to a second aspect of the present invention, an exemplary video residual decoding apparatus is disclosed. The exemplary video residual decoding apparatus is used for applying residual decoding to a transform block that is divided into sub-blocks, and includes a residual decoding circuit and a storage device. The residual decoding circuit is arranged to enter a coefficient loop for decoding one or more syntax elements at each of coefficient positions within a sub-block that has at least one non-zero coefficient level, wherein the sub-block is included in the transform block. During the coefficient loop, the residual decoding circuit is arranged to record state information in the storage device, where the state information is associated with states of dependent quantization at coefficient positions within the sub-block. The residual decoding circuit is arranged to refer to at least the state information recorded in the storage device for updating transform coefficient levels of the sub-block.

According to a third aspect of the present invention, an exemplary video residual decoding method is disclosed. The exemplary video residual decoding method is used for applying residual decoding to a transform block that is divided into sub-blocks, and includes: regarding a sub-block having at least one non-zero coefficient level, entering a coefficient loop for decoding one or more syntax elements at each of coefficient positions within the sub-block, wherein the sub-block is included in the transform block, and the coefficient loop comprises a plurality of decoding passes that are arranged to operate in sequence, and the plurality of decoding passes comprise one decoding pass and at least one other decoding pass; during the at least one other decoding pass, recording, by a storage device, side information indicative of specific coefficient positions at which specific syntax elements need to be decoded in the one decoding pass; and during the one decoding pass, referring to the side information recorded in the storage device for selecting the specific coefficient positions within the sub-block and decoding the specific syntax elements at the specific coefficient positions.

According to a fourth aspect of the present invention, an exemplary video residual decoding method is disclosed. The exemplary video residual decoding method is used for applying residual decoding to a transform block that is divided into sub-blocks, and includes: regarding a sub-block having at least one non-zero coefficient level, entering a coefficient loop for decoding one or more syntax elements at each of coefficient positions within the sub-block, wherein the sub-block is included in the transform block; during the coefficient loop, recording, by a storage device, state information associated with states of dependent quantization at coefficient positions within the sub-block; and referring to at least the state information recorded in the storage device for updating transform coefficient levels of the sub-block.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

In embodiments of the present invention, an entropy decoder of a video decoder (e.g. VVC/H.266 decoder) may perform residual decoding upon a transform block according to a predetermined scan order (e.g., diagonal scan order). In the following, the term "transform block" may denote a block of quantization indexes (also called transform coefficient levels) at different coefficient positions, regardless of whether they are generated by transform and quantization at the encoder side or generated by quantization only at the encoder side. One transform block (TB) may be divided into a plurality of sub-blocks (SBs), and each SB may include a plurality of coefficients. The SB size may be 4×4 or 2×2, depending upon the TB size.

Figure 1:
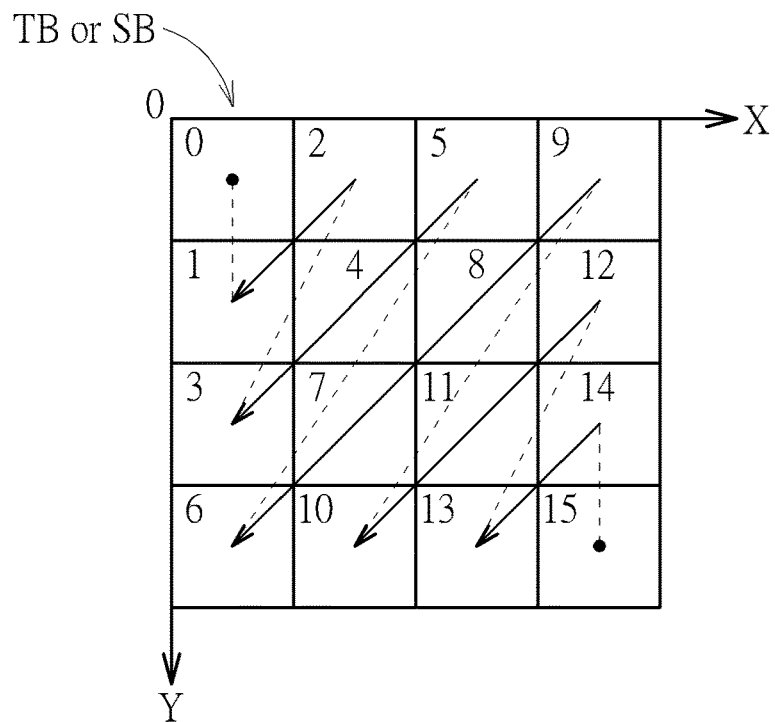
FIG. 1 is a diagram illustrating a reverse diagonal scan order employed by regular-mode residual decoding according to an embodiment of the present invention.

In a case where the residual decoding is performed under a VVC regular mode, a reverse diagonal scan order from right-bottom to left-top may be employed for decoding sub-blocks within one transform block and coefficients within each sub-block of the transform block. FIG. 1 is a diagram illustrating a reverse diagonal scan order employed by regular-mode residual decoding according to an embodiment of the present invention. Suppose that the TB size is 16×16 and the SB size is 4×4. Regarding one transform block, the sub-blocks indexed by 0-15 are decoded in the reverse diagonal scan order (i.e. 15→14→13 . . . →2→1→0). Regarding each of the sub-blocks within the same transform block, coefficients indexed by coefficient positions (scan positions) 0-15 are also decoded in the reverse diagonal scan order (i.e. 15→14→13 . . . →2→1→0).

Figure 2:
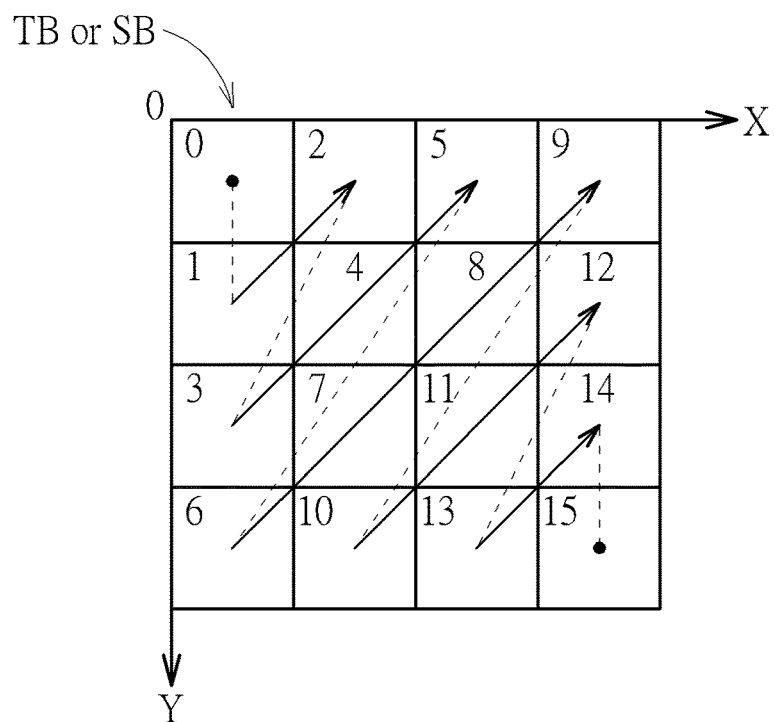
FIG. 2 is a diagram illustrating a forward diagonal scan order employed by TS-mode residual decoding according to an embodiment of the present invention.

In another case where the residual coding is performed under a VVC transform skip (TS) mode, a forward diagonal scan order from left-top to right-bottom may be employed for decoding sub-blocks within one transform block and coefficients within each sub-block of the transform block. FIG. 2 is a diagram illustrating a forward diagonal scan order employed by TS-mode residual decoding according to an embodiment of the present invention. Suppose that the TB size is 16×16 and the SB size is 4×4. Regarding one transform block, the sub-blocks indexed by 0-15 are decoded in the forward diagonal scan order (i.e. 0→1→2 . . . →13→14→15). Regarding each of the sub-blocks within the same transform block, coefficients indexed by coefficient positions (scan positions) 0-15 are also decoded in the forward diagonal scan order (i.e. 0→1→2 . . . →13→14→15).

Figure 3:
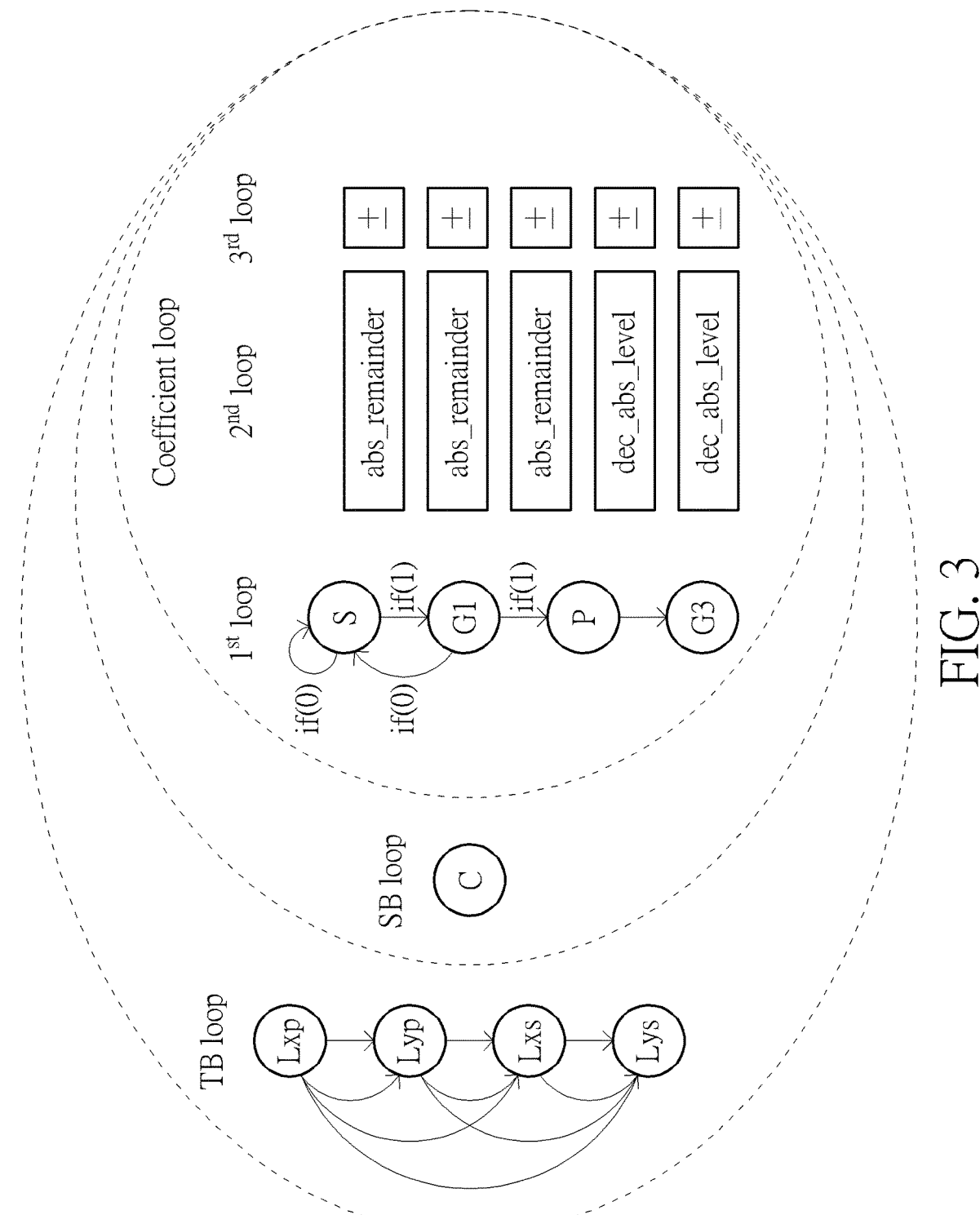
FIG. 3 is a diagram illustrating residual syntax decoding according to an embodiment of the present invention.

The residual syntax decoding of one transform block may include a plurality of decoding loops. Taking the VVC regular-mode residual decoding of one transform block for example, it may include a TB loop, an SB loop, and a coefficient loop. FIG. 3 is a diagram illustrating residual syntax decoding according to an embodiment of the present invention. The TB loop is performed for determining a last significant coefficient position which is coded as x-coordinate and y-coordinate, relative to the top-left corner of the transform block. Specifically, each of x-coordinate and y-coordinate is represented by a prefix codeword last_sig_coeff_*_prefix and a suffix codeword last_sig_coeff_*_suffix. As shown in FIG. 3, the prefix part for the x-coordinate is labeled by Lxp, the prefix part for the y-coordinate is labeled by Lyp, the suffix part for the x-coordinate is labeled by Lxs, and the suffix part for the y-coordinate is labeled by Lys. The residual syntax decoding of one transform block starts from the last significant coefficient position, and then follows a predetermined scan order (e.g. reverse diagonal scan order shown in FIG. 1) to apply decoding to following coefficient positions within a current sub-block containing the last significant coefficient position, and follows the predetermined scan order (e.g. reverse diagonal scan order shown in FIG. 1) to apply decoding to following sub-blocks in the transform block and coefficient positions in each of the following sub-blocks. The SB loop is performed for decoding a syntax element sb_coded_flag (labeled by "C" in FIG. 3) for one sub-block, where the syntax element sb_coded_flag indicates existence of any non-zero coefficient level inside the sub-block. If the syntax element sb_coded_flag is equal to 0, it indicates that the sub-block contains all zero coefficient levels. If the syntax element sb_coded_flag is equal to 1, it indicates that the sub-block contains one or more non-zero coefficient levels.

If the syntax element sb_coded_flag[xS, yS] decoded for a current sub-block located at (xS, yS) is equal to 1, the coefficient loop of the sub-block is performed to decode one or more syntax elements at each of coefficient positions within a sub-block that has at least one non-zero coefficient level. The coefficient loop includes multiple decoding passes that are arranged to operate in sequence. For example, a later decoding pass of the coefficient loop may not start until a prior decoding pass of the coefficient loop traverses a last coefficient position within one sub-block according to the predetermined scan order (e.g. reverse diagonal scan order).

In the first decoding pass (labeled by "$1^{st}$ loop" in FIG. 3) of the coefficient loop, the syntax element(s) to be decoded may include sig_coeff_flag (labeled by "S" in FIG. 3), abs_level_gtx_flag[0] (labeled by "G1" in FIG. 3), abs_level_gtx_flag[1] (labeled by "G3" in FIG. 3), and/or par_level_flag (labeled by "P" in FIG. 3). The syntax element sig_coeff_flag indicates whether the absolute value of the coefficient level is larger than 0. The syntax element abs_level_gtx_flag[0] indicates whether the absolute value of the coefficient level is larger than 1. The syntax element par_level_flag indicates the parity of the absolute value of the coefficient level. The syntax element abs_level_gtx_flag[1] indicates whether the absolute value of the coefficient level is larger than 3. The syntax element abs_level_gtx_flag[0] is only decoded when the syntax element sig_coeff_flag indicates that the absolute value of the coefficient level is not equal to 0. The syntax element par_level_flag is only decoded when the syntax element syntax element abs_level_gtx_flag[0] indicates that the absolute value of the coefficient level is greater than 1. The syntax element abs_level_gtx_flag[1] is only decoded when the syntax element syntax element abs_level_gtx_flag[0] indicates that the absolute value of the coefficient level is greater than 1.

In the second decoding pass (labeled by "$2^{nd}$ loop" in FIG. 3) of the coefficient loop, the syntax element to be decoded may be abs_remainder or dec_abs_level. The syntax element abs_remainder is the remainder after a partially reconstructed absolute value AbsLevelPass1 is obtained from the first decoding pass, where AbsLevelPass1=sig_coeff_flag+abs_level_gtx_flag[0]+par_level_flag+2*abs_level_gtx_flag[0]. In order to increase the worst-case throughput, the number of context-coded bins that can be used by the encoder is restricted. Hence, the first decoding pass may be terminated within a sub-block, and an absolute value of a coefficient level at any coefficient position not covered by the first decoding pass may be represented by the syntax element dec_abs_level.

In the third decoding pass (labeled by "$3^{rd}$ loop" in FIG. 3) of the coefficient loop, the syntax element to be decoded is coeff_sign_flag. The syntax element coeff_sign_flag indicates the sign of the coefficient level.

Regarding a coefficient position within a sub-block, the second decoding pass is needed for decoding a syntax element abs_remainder when the syntax element abs_level_gtx_flag[1] decoded in the first decoding pass indicates that an absolute value of a coefficient level is greater than 3 (i.e. abs_level_gtx_flag[1]==1). Furthermore, regarding a coefficient position within a sub-block, the third decoding pass is needed for decoding a syntax element coeff_sign_flag when the syntax element sig_coeff_flag decoded in the first decoding pass indicates that an absolute value of a coefficient level is greater than 0 (i.e. sig_coeff_flag==1) or an absolute value AbsLevel of a coefficient level derived from the syntax element dec_abs_level decoded in the second decoding pass is greater than 0 (i.e. AbsLevel>0). If side information is recorded to indicate coefficient positions that need to be decoded in a later decoding pass, the computational burden of the entropy decoder can be eased. In VVC, trellis-coded quantization (TCQ) may be adopted, which is also termed as dependent quantization. Hence, when an absolute value AbsLevel of a coefficient level is larger than 0, a state of dependent quantization Qstate may be used to update the coefficient level TransCoeffLevel. If the state of dependent quantization Qstate obtained during the coefficient loop is recorded for later use in updating of the coefficient level TransCoeffLevel, the computational burden of the entropy decoder can be eased.

Figure 4:
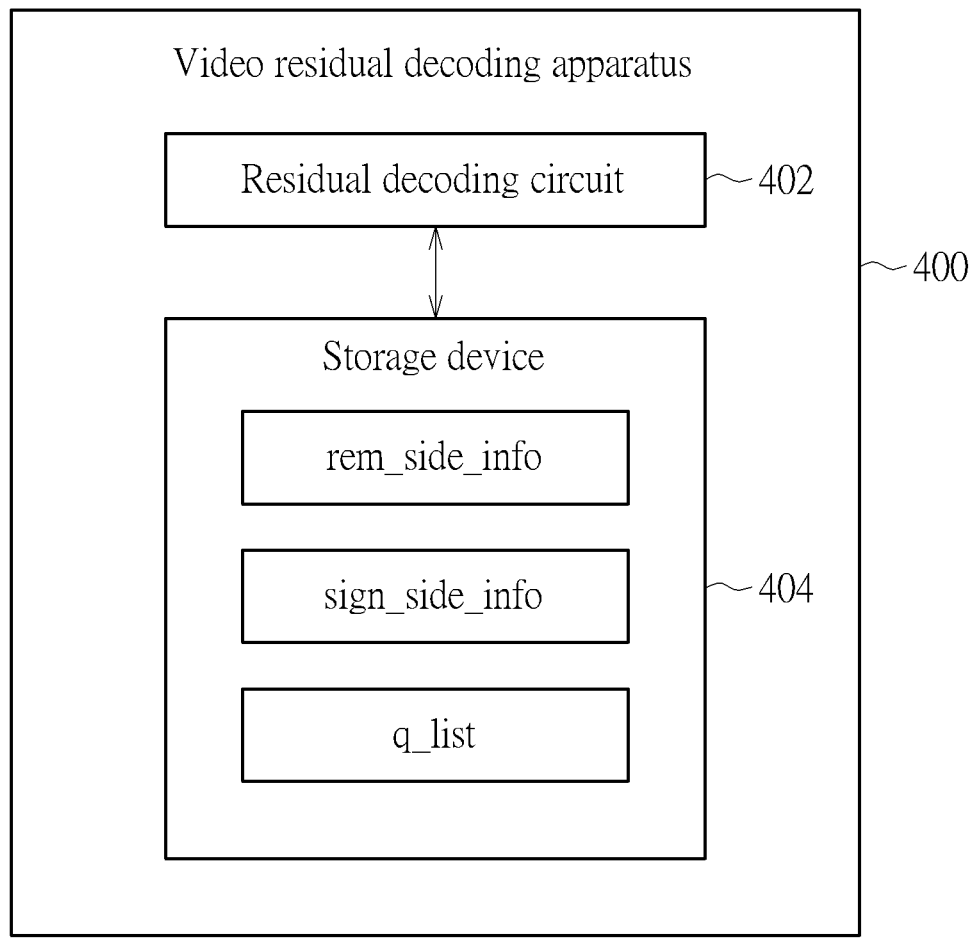
FIG. 4 is a diagram illustrating a video residual decoding apparatus according to an embodiment of the present invention.

Based on above observations, the present invention proposes an innovative residual decoding design with less computation, compared to the conventional residual decoding design. FIG. 4 is a diagram illustrating a video residual decoding apparatus according to an embodiment of the present invention. The video residual decoding apparatus 400 may be a part of a VVC/H.266 decoder. However, this is for illustrative purposes only, and is not meant to be a limitation of the present invention. In practice, any video decoder using at least one of the syntax decoding optimization techniques proposed by the present invention falls within the scope of the present invention. The video residual decoding apparatus 400 may include a residual decoding circuit 402 and a storage device 404. The residual decoding circuit 402 is coupled to the storage device 404, and is arranged to enter a coefficient loop for decoding one or more syntax elements at each of coefficient positions within a sub-block that has at least one non-zero coefficient level, wherein the sub-block is included in a transform block, the coefficient loop includes a plurality of decoding passes that are arranged to operate in sequence, and the decoding passes include a later decoding pass (e.g. $2^{nd}$ decoding pass or $3^{rd}$ decoding pass) and at least one prior decoding pass (e.g. $1^{st}$ decoding pass, or $1^{st}$ and $2^{nd}$ decoding passes). During the at least one prior decoding pass (e.g. $1^{st}$ decoding pass, or $1^{st}$ and $2^{nd}$ decoding passes), the residual decoding circuit 402 is arranged to record side information (e.g. rem_side_info or sign_side_info) in the storage device 404, where the side information (e.g. rem_side_info or sign_side_info) is indicative of specific coefficient positions at which specific syntax elements (e.g., abs_remainder or coeff_sign_flag) need to be decoded in the later decoding pass (e.g. $2^{nd}$ decoding pass or $3^{rd}$ decoding pass). Hence, during the later decoding pass (e.g. $2^{nd}$ decoding pass or $3^{rd}$ decoding pass), the residual decoding circuit 402 is arranged to refer to the side information (e.g. rem_side_info or sign_side_info) recorded in the storage device 404 for selecting the specific coefficient positions within the sub-block, and decoding the specific syntax elements at the specific coefficient positions, respectively. Hence, regarding remaining coefficient positions within the sub-block that are not indicated by the side information (e.g. rem_side_info or sign_side_info), decoding of these syntax elements (e.g., abs_remainder or coeff_sign_flag) can be fully skipped for computation reduction.

In a conventional VVC decoder design, no matter whether a coefficient position needs decoding of a syntax element or not, the associated decoding pass still traverses the coefficient position within the decoding unit. Taking decoding of the syntax element abs_remainder for example, the conventional approach may be expressed by using the following pseudo codes.

```
for( n = firstPosMode0; n > firstPosMode1; n- - ) { // coefficient
2nd loop: abs_remainder
   ......
   if( abs_level_gtx_flag[n][1] )
   abs_remainder[n]
   // storage for AbsLevel (2)
   AbsLevel[xC][yC] = AbsLevelPass1[xC][yC] + 2*abs_remainder[ n ]
   } // end of loop
```

For a coefficient position (scan position) [n] within a sub-block (n={0, 1, 2, . . . , 15} if the SB size is 4×4 as shown in FIG. 1), the syntax element abs_level_gtx_flag [n][1] decoded in the prior decoding pass (e.g. $1^{st}$ decoding pass) is first checked by the later decoding pass (e.g. $2^{nd}$ decoding pass) to determine whether the syntax element abs_remainder [n] needs to be decoded for determining the absolute value AbsLevel[xC][yC], where the current coefficient is located at (xC, yC). Hence, no matter whether the syntax element abs_remainder[n] needs to be decoded or not, the operation of checking the syntax element abs_level_gtx_flag[n][1] is still performed once. To improve the decoding performance, the present invention proposes collecting the side information rem_side_info and recording the collected side information rem_side_info in the storage device 404 during the prior decoding pass (e.g. $1^{st}$ decoding pass), where the side information rem_side_info is indicative of coefficient positions at which syntax elements abs_remainder need to be decoded in the later decoding pass (e.g. $2^{nd}$ decoding pass) following the prior decoding pass (e.g. $1^{st}$ decoding pass).

Figure 5:
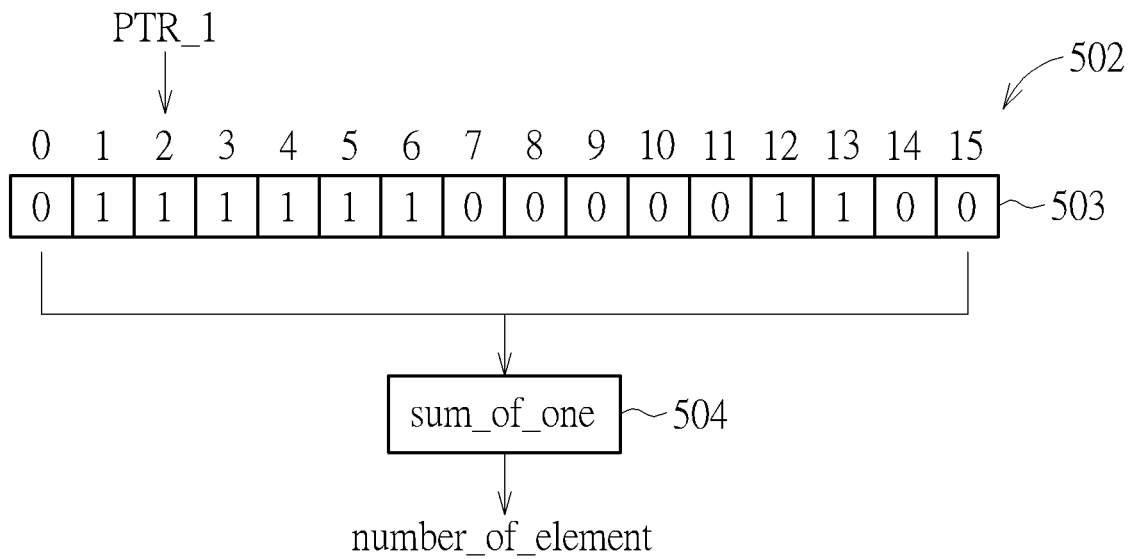
FIG. 5 is a diagram illustrating one design of storage of the side information and computation of the number of syntax elements according to an embodiment of the present invention.

In one embodiment, the side information rem_side_info records coefficient positions at which syntax elements abs_remainder need to be decoded in the later decoding pass (e.g. $2^{nd}$ decoding pass). The number of the syntax elements abs_remainder that need to be decoded in the later decoding pass (e.g. $2^{nd}$ decoding pass) may be derived from processing the side information rem_side_info recorded in the storage device 404. FIG. 5 is a diagram illustrating one design of storage of the side information and computation of the number of syntax elements according to an embodiment of the present invention. The storage device 404 may include a flag storage 502 having a plurality of storage units 503 indexed by different coefficient locations {0, 1, . . . , 15} within one sub-block, respectively. When the syntax element abs_remainder at a coefficient position needs to be decoded in the later decoding pass, a flag recorded in a storage unit indexed by the coefficient position is set by a first logic value (e.g. 1). When the syntax element abs_remainder at a coefficient position does not need to be decoded in the later decoding pass, a flag recorded in a storage unit indexed by the coefficient position is set by a second logic value (e.g. 0). The residual processing circuit 402 may be configured to have a computation circuit (labeled by "sum of one") 504 used to generate the number of syntax elements number_of_element (e.g. the number of syntax elements abs_remainder to be decoded in the later decoding pass) by computing the sum of all 1's recorded in the flag storage 502, where the "1" flags may be accessed through a pointer PTR 1.

Figure 6:
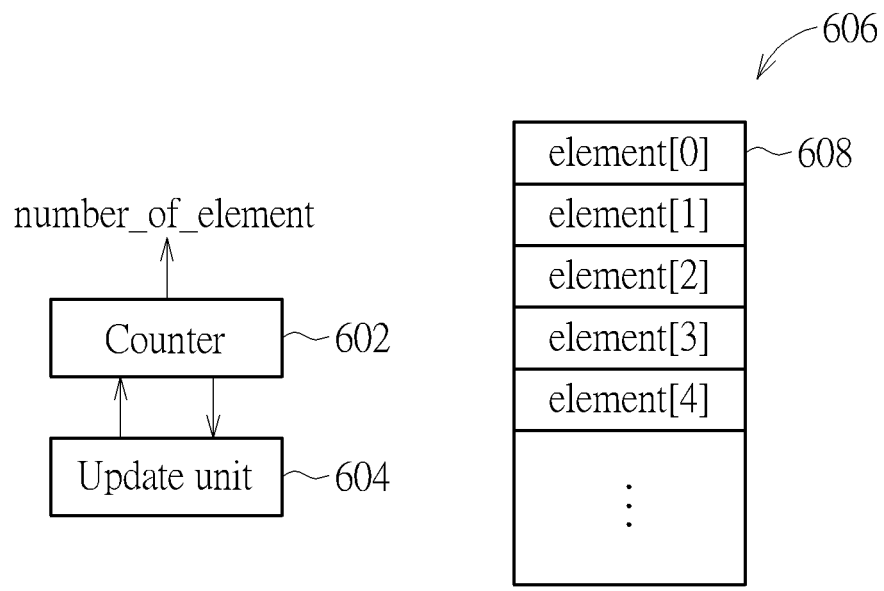
FIG. 6 is a diagram illustrating another design of storage of the side information and computation of the number of syntax elements according to an embodiment of the present invention.

In another embodiment, the side information rem_side_info records coefficient positions at which syntax elements abs_remainder need to be decoded in the later decoding pass (e.g. $2^{nd}$ decoding pass), and also records the number of the syntax elements abs_remainder that need to be decoded in the later decoding pass (e.g. $2^{nd}$ decoding pass). FIG. 6 is a diagram illustrating another design of storage of the side information and computation of the number of syntax elements according to an embodiment of the present invention. The residual processing circuit 402 may be configured to have a counter 602 and an update unit 604 cooperating for counting the number of syntax elements number_of_element (e.g. the number of syntax elements abs_remainder) to be decoded in the later decoding pass. The number of syntax elements number_of_element is stored into the storage device 404. The storage device 404 may include an array 606 having a plurality of elements 608, each being used to record one coefficient position at which the syntax element abs_remainder need to be decoded in the later decoding pass.

The proposed approach may be expressed by using the following pseudo codes.

```
rem_pos[ ] = {}; // initialize position array to empty
num_of_rem = 0; // initialize to 0
for(n = firstPosMode0; n >= 0 && remBinsPass1 >= 4; n- - ) { //
coefficient 1st loop:pass1
  ......
  sig_coeff_flag[xC][yC]
  abs_level_gtx_flag[n][0]
  par_level_flag[n]
  abs_level_gtx_flag[n][1]
  if(abs_level_gtx_flag[n][1] == 1) {
    rem_pos[num_of_rem] = n;
    num_of_rem ++ ;
  }
  ......
} // end of 1st loop
for( ir = 0; ir < num_of_rem ; ir++ ) { // coefficient 2nd loop:
abs_remainder
  ......
  abs_remainder[rem_pos[ir]]
  // storage for AbsLevel (2)
AbsLevel[xC][yC] = AbsLevelPass1[xC][yC] +
2*abs_remainder[rem_pos[ir]]
  } // end of loop
```

In this example, the side information rem_side_info includes a position array rem_pos[ ] and a counter value num_of_rem. The position array rem_pos[ ] is used to record coefficient positions at which syntax elements abs_remainder need to be decoded in the later decoding pass (e.g. $2^{nd}$ decoding pass). The counter value num_of_rem is used to record the number of syntax elements abs_remainder that need to be decoded in the later decoding pass (e.g. $2^{nd}$ decoding pass). The counter value num_of_rem is used to control iterations of the for loop in the later decoding pass (e.g. $2^{nd}$ decoding pass). Initially, the position array rem_pos[ ] is cleared to be an empty array, and the counter value num_of_rem is set by an initial value such as 0. During the $1^{st}$ decoding pass of the coefficient loop, when the syntax element abs_level_gtx_flag [n][1] at the coefficient position (scan position) [n] within one sub-block is decoded and indicates that the absolute value of the coefficient level is greater than a predetermined value (i.e. abs_level_gtx_flag [n][1]==1), the residual decoding circuit 402 records the coefficient position (scan position) [n] in an array element indexed by the current counter value num_of_rem (i.e. rem_pos[num_of_rem]=n), and then updates the counter value num_of_rem by the current counter value num_of_rem plus 1 (i.e. num_of_rem++). The predetermined value is equal to 3 for VVC regular-mode residual decoding. In practice, the predetermined value may be adjusted, depending upon a residual decoding mode specified by a video standard. At the end of the 1$^{st}$ decoding pass of the coefficient loop, the side information rem_side_info (which may record rem_pos[ ] and num_of_rem) is available in the storage device 404.

During the 2$^{nd}$ decoding pass of the coefficient loop, the residual decoding circuit 402 refers to the side information rem_side_info (which may record rem_pos[ ] and num_of_rem) recorded in the storage device 404 to achieve loop iteration reduction. More specifically, no checking of the syntax element abs_level_gtx_flag [1] is performed at a coefficient position that is not recorded in the position array rem_pos[ ], and no decoding of the syntax element abs_remainder is performed at a coefficient position that is not recorded in the position array rem_pos[ ]. The loop iteration number of the 2$^{nd}$ decoding pass is equal to the counter value num_of_rem recorded in the storage device 404. During one iteration of the for loop in the 2$^{nd}$ decoding pass, the residual decoding circuit 402 reads a coefficient position from an array element rem_pos[ir] indexed by a counter value ir, and decodes the syntax element abs_remainder for the coefficient position recorded in the position array rem_pos[ir]. The counter value ir is initialized by 0, and is increased by 1 each time one loop iteration is done. The for loop is terminated when a condition of ir<num_of_rem is not met. The condition is evaluated once before every loop iteration. When the next iteration of the for loop in the 2$^{nd}$ decoding pass is executed, the residual decoding circuit 402 reads a coefficient position from a next array element rem_pos[ir] indexed by an updated counter value ir (i.e. ir++), and decodes the syntax element abs_remainder for the coefficient position recorded in the position array rem_pos[ir].

As mentioned above, no matter whether a coefficient position needs decoding of a syntax element or not, the associated decoding pass performed by the conventional VVC decoder design still traverses the coefficient position within the decoding unit. Taking decoding of the syntax element coeff_sign_flag for another example, the conventional approach may be expressed by using the following pseudo codes.

For a coefficient position (scan position) [n] within a sub-block (n={0, 1, 2, . . . , 15} if the SB size is 4×4 as shown in FIG. 1), an absolute value AbsLevel[xC][yC] of a coefficient level that is calculated in the prior decoding pass (e.g. 2$^{nd}$ decoding pass) may be first checked by the later decoding pass (e.g. 3$^{rd}$ decoding pass) to determine whether the syntax element coeff_sign_flag[n] needs to be decoded, where the current coefficient is located at (xC, yC). Hence, no matter whether the syntax element coeff_sign_flag [n] needs to be decoded or not, the operation of checking the absolute value AbsLevel[xC][yC] is still performed once. To improve the decoding performance, the present invention proposes collecting the side information sign_side_info and recording the collected side information sign_side_info in the storage device 404 during one or more prior decoding passes (e.g. 2$^{nd}$ decoding pass, or 1$^{st}$ and 2$^{nd}$ decoding passes), where the side information sign_side_info is indicative of coefficient positions at which syntax elements coeff_sign_flag need to be decoded in the later decoding pass (e.g. 3$^{rd}$ decoding pass).

In one embodiment, the side information sign_side_info records coefficient positions at which syntax elements coeff_sign_flag need to be decoded in the later decoding pass (e.g. 3rd decoding pass). The number of the syntax elements coeff_sign_flag that need to be decoded in the later decoding pass (e.g. 3$^{rd}$ decoding pass) may be derived from processing the side information sign_side_info recorded in the storage device 404. For example, the design shown in FIG. 5 may be employed. Similar description is omitted here for brevity.

In another embodiment, the side information sign_side_info records coefficient positions at which syntax elements coeff_sign_flag need to be decoded in the later decoding pass (e.g. 3rd decoding pass), and also records the number of the syntax elements coeff_sign_flag need to be decoded in the later decoding pass (e.g. 3rd decoding pass). For example, the design shown in FIG. 6 may be employed. Similar description is omitted here for brevity.

The proposed approach may be expressed by using the following pseudo codes.

```
for( n = numSbCoeff - 1; n >= 0; n- - ) {// coefficient 3rd loop:
sign
  if ( ( AbsLevel[xC][yC] > 0 ) && ( !signHiddenFlag | | ( n !=
firstSigScanPosSb ) ) )
   coeff_sign_flag[n]
}
```

```
sign_pos[ ] = {}; // initializeposition array to empty
num_of_sign = 0; // initialize to 0
for(n = firstPosMode0; n >= 0 && remBinsPass1 >= 4; n- - ) { //
coefficient 1st loop:pass1
    ......
    sig_coeff_flag[xC][yC]
    if(sig_coeff_flag[xC][yC] == 1) {
       sign_pos[num_of_sign] = n;
       num_of_sign ++ ;
    }
    abs_level_gtx_flag[n][0]
    par_level_flag[n]
    abs_level_gtx_flag[n][1]
} // end of 1st loop
for( n = firstPosMode1; n >= 0; n- - ) { // coefficient 2nd loop:
abs_level
    ......
    if( sb_coded_flag[xS][yS] )
      dec_abs_level[n]
AbsLevel[xC][yC] = Golomb-Rice_de_binarization(dec_abs_level[n]);
// standard
AbsLevel[xC][yC] = Zero_Pos_Mapping( ); // standard
    if(AbsLevel[xC][yC] != 0) {
       sign_pos[num_of_sign] = n;
       num_of_sign ++ ; // add one
    }
} // end of loop
signHiddenFlag =
    sh_sign_data_hiding_used_flag && ( lastSigScanPosSb -
firstSigScanPosSb > 3 ? 1 : 0 )
if(signHiddenFlag )
    num_of_sign-- ; // munus one
    for( is = 0; is < num_of_sign ; is++ ) {// coefficient 3rd loop:
sign
       coeff_sign_flag[sign_pos[is]]
    }
```

The side information sign_side_info includes a position array sign_pos[ ] and a counter value num_of_sign. The position array sign_pos[ ] is used to record coefficient positions at which syntax elements coeff_sign_flag need to be decoded in the later decoding pass (e.g. $3^{rd}$ decoding pass). The counter value num_of_sign is used to record the number of syntax elements coeff_sign_flag that need to be decoded in the later decoding pass (e.g. 3rd decoding pass). The counter value num_of_sign is used to control iterations of the for loop in the later decoding pass (e.g. 3rd decoding pass). Initially, the position array sign_pos[ ] is cleared to be an empty array, and the counter value num_of_sign is set by an initial value such as 0. During the $1^{st}$ decoding pass of the coefficient loop, when the syntax element sig_coeff_flag [xC][yC] at the coefficient position (scan position) [n] within one sub-block is decoded and indicates that the absolute value of the coefficient level is greater than 0 (i.e. sig_coeff_flag[xC][yC]==1), the residual decoding circuit 402 records the coefficient position (scan position) [n] in an array element indexed by the current counter value num_of_sign (i.e. sign_pos[num_of_sign]=n), and then updates the counter value num_of_sign by the current counter value num_of_sign plus 1 (i.e. num_of_sign++). Hence, at the end of the $1^{st}$ decoding pass of the coefficient loop, the side information sign_side_info (which may record sign_pos[ ] and num_of_sign) is available in the storage device 404.

It is possible the number of context-coded bins that can be used by the encoder is restricted. Hence, the first decoding pass may be terminated within a sub-block, and an absolute value of a coefficient level at any coefficient position not covered by the first decoding pass may be represented by the syntax element dec_abs_level. Hence, the side information sign_side_info (which may record sign_pos[ ] and num_of_sign) in the storage device 404 may be further updated in another decoding pass (e.g. $2^{nd}$ decoding pass). During the $2^{nd}$ decoding pass of the coefficient loop, when the absolute value AbsLevel[xC][yC] at the coefficient position (scan position) [n] within one sub-block is derived from the decoded syntax element dec_abs_level[n] and is greater than 0 (i.e. AbsLevel[xC][yC] !=0), the residual decoding circuit 402 records the coefficient position (scan position) [n] in an array element indexed by the current counter value num_of_sign (i.e. sign_pos[num_of_sign]=n), and then updates the counter value num_of_sign by the current counter value num_of_sign plus 1 (i.e. num_of_sign++). Hence, at the end of the $2^{nd}$ decoding pass of the coefficient loop, the side information sign_side_info (which may record sign_pos[ ] and num_of_sign) is updated and available in the storage device 404.

Sign data hiding is a coding efficiency improvement technique that omits the coding of the sign of one non-zero coefficient level for saving one bit per sub-block and instead derives it from the parity of the sum of absolute values of coefficient levels in the sub-block. In a case where sign data hiding is used (i.e. signHiddenFlag==1), the residual decoding circuit 402 further updates the counter value num_of_sign by the current counter value num_of_sign minus one (i.e. num_of_sign--).

During the 3rd decoding pass of the coefficient loop, the residual decoding circuit 402 refers to the side information sign_side_info (which may record sign_pos[ ] and num_of_sign) recorded in the storage device 404 to achieve loop iteration reduction. More specifically, no checking of the absolute value AbsLevel is performed at a coefficient position that is not recorded in the position array sign_pos[ ], and no decoding of the syntax element coeff_sign_flag is performed at a coefficient position that is not recorded in the position array sign_pos[ ]. The loop iteration number of the $3^{rd}$ decoding pass is equal to the counter value num_of_sign. During one iteration of the for loop in the 3rd decoding pass, the residual decoding circuit 402 reads a coefficient position from an array element sign_pos[is] indexed by a counter value is, and decodes the syntax element coeff_sign_flag for the coefficient position recorded in the position array sign_pos[is]. The counter value is initialized by 0, and is increased by 1 each time one loop iteration is done. The for loop is terminated when a condition of is <num_of_sign is not met. The condition is evaluated once before every loop iteration. When the next iteration of the for loop in the 3rd decoding pass is executed, the residual decoding circuit 402 reads a coefficient position from a next array element sign_pos[is] indexed by an updated counter value is (i.e. is ++), and decodes the syntax element coeff_sign_flag for the coefficient position recorded in the position array sign_pos[is].

Furthermore, in a conventional VVC decoder design, quantization-related information calculated by one decoding pass is re-calculated by another decoding pass. For example, the conventional approach performs determination of state of dependent quantization QState in each of the $1^{st}$ decoding pass and the $2^{nd}$ decoding pass, where the determination of state of dependent quantization QState may be expressed by using the following pseudo codes.

```
if( sh_dep_quant_used_flag )
  Qstate = QStateTransTable[QState][AbsLevelPass1[xC][yC] & 1]
```

However, the conventional approach re-starts determination of state of dependent quantization QState in a post-processing pass (e.g. level generation loop) following the $3^{rd}$ decoding pass of the coefficient loop, where the determination of state of dependent quantization QState may be expressed by using the following pseudo codes.

```
if ( sh_dep_quant_used_flag ) {
QState = startQStateSb
 for( n = numSbCoeff - 1; n >= 0; n- - ) { // level
generation loop
  ......
    if ( AbsLevel[xC][yC] > 0 )
TransCoeffLevel[x0][y0][cIdx][xC][yC] =
( 2*AbsLevel[xC][yC]-( QState > 1 ? 1 : 0 ) ) * ( 1 -
2*coeff_sign_flag[n] )
QState = QStateTransTable[QState][AbsLevel[xC][yC] & 1 ]
   } else {
      the similar way to HEVC approach (sign hidden)
```

To improve the decoding performance, the present invention proposes collecting the state information q_list and recording the collected state information q_list in the storage device 404 during one or more prior decoding passes (e.g. $1^{st}$ decoding pass, or $1^{st}$ and $2^{nd}$ decoding passes) of the coefficient loop, where the state information q_list is associated with states of dependent quantization at coefficient positions within one sub-block. In one embodiment, the state information q_list may directly record states of dependent quantization at coefficient positions within one sub-block. In another embodiment, each coefficient position at which a state of dependent quantization is larger than a predetermined value (e.g. QState>1) may be indicated by the state information q_list, where the state information q_list does not directly record states of dependent quantization at coefficient positions within one sub-block. To put is simply, any data type that can derive "QState>1" may be adopted by the state information q_list. The residual decoding circuit 402 can refer to at least the state information q_list recorded in the storage device 404 for updating transform coefficient levels of the sub-block.

The proposed approach may be expressed by using the following pseudo codes.

```
QState = 0
for ( i = lastSubBlock; i >= 0; i- - ) {
 startQStateSb = QState
 if( i < lastSubBlock && i > 0 ) {
   sb_coded_flag[xS][yS]
```

-continued

```
    }
    q_list = {}; // initialize to empty
    for(n = firstPosMode0; n >= 0 && remBinsPass1 >= 4; n- - ) { //
coefficient 1st loop:pass1
    ......
        sig_coeff_flag[xC][yC]
        abs_level_gtx_flag[n][0]
        par_level_flag[n]
        abs_level_gtx_flag[n][1]
        q_list[n] = (Qstate > 1);
        if( sh_dep_quant_used_flag ) {
QState = QStateTransTable[QState][AbsLevelPass1[xC][yC] & 1 ]
    } // end of 1ˢᵗ loop
    for ( n = firstPosMode1; n >= 0; n- - ) { // coefficient 2nd loop:
abs_level
    ......
        if( sb_coded_flag[xS][yS] )
            dec_abs_level[n]
        // generate AbsLevel[xC][yC] based on the VVC standard including
        // ZeroPos mapping and Golomb-Rice de-binarization
        if( AbsLevel[xC][yC] > 0 ) {
            if( lastSigScanPosSb = = -1 )
                lastSigScanPosSb = n
            firstSigScanPosSb = n
        }
        q_list[n] = (Qstate > 1);
        if( sh_dep_quant_used_flag )
QState = QStateTransTable[QState][AbsLevel[xC][yC] & 1 ]
    } // end of loop
    signHiddenFlag =
        sh_sign_data_hiding_used_flag && ( lastSigScanPosSb -
firstSigScanPosSb > 3 ? 1 : 0 )
    for ( n = numSbCoeff - 1; n >= 0; n- - ) {// coefficient 3rd loop:
sign
        if ( ( AbsLevel[xC][yC] > 0 ) && ( !signHiddenFlag | | ( n !=
firstSigScanPosSb ) ) )
            coeff_sign_flag[n]
    }
    if( sh_dep_quant_used_flag ) {
        for( n = numSbCoeff - 1; n >= 0; n- - ) { // level
generation loop
        ......
            if ( AbsLevel[xC][yC] > 0 )
TransCoeffLevel[x0][y0][cIdx][xC][yC]=
(2*AbsLevel[xC][yC]-q_list
[n] )* ( 1 - 2* coeff_sign_flag[ n ] )
        } else {
            the similar way to HEVC approach (sign hidden)
        }
    }
} // end of SB loop
```

In one embodiment, the state information q_list may be implemented by a list structure. Initially, the state information q_list is cleared to be an empty list. During the $1^{st}$ decoding pass of the coefficient loop, the residual decoding circuit 402 may record a state of dependent quantization at a coefficient position (scan position) [n] within one sub-block in a list entry indexed by the coefficient position (scan position) [n], or may record state-related information "QState>1" in a list entry indexed by the coefficient position (scan position) [n] when a state of dependent quantization at a coefficient position (scan position) [n] within one sub-block is larger than 1. Hence, at the end of the $1^{st}$ decoding pass of the coefficient loop, the state information q_list is available in the storage device 404.

It is possible the number of context-coded bins that can be used by the encoder is restricted. Hence, the first decoding pass may be terminated within a sub-block, and an absolute value of a coefficient level at any coefficient position not covered by the first decoding pass may be represented by the syntax element dec_abs_level. Hence, the state information q_list in the storage device 404 may be further updated in another decoding pass (e.g., $2^{nd}$ decoding pass). During the $2^{nd}$ decoding pass of the coefficient loop, the residual decoding circuit 402 may record a state of dependent quantization at a coefficient position (scan position) [n] within one sub-block in a list entry indexed by the coefficient position (scan position) [n], or may record state-related information "QState>1" in a list entry indexed by the coefficient position (scan position) [n] when a state of dependent quantization at a coefficient position (scan position) [n] within one sub-block is larger than 1. Hence, at the end of the $2^{nd}$ decoding pass of the coefficient loop, the state information q_list is updated and available in the storage device 404.

When dependent quantization is used (i.e. sh_dep_quant_used_flag==1), the residual decoding circuit 402 may update the transform coefficient levels TransCoeffLevel of the sub-block during a level generation loop following the coefficient loop. Hence, during the level generation loop, the residual decoding circuit 402 may update the transform coefficient levels TransCoeffLevel of the sub-block according to at least the state information q_list recorded in the storage device 404, without doing re-calculation of state of dependent quantization.

In the above embodiment, the residual decoding circuit 402 does not start updating the transform coefficient levels TransCoeffLevel of the sub-block until the level generation loop is entered. However, this is for illustrative purposes only, and is not meant to be a limitation of the present invention. In some embodiments of the present invention, transform coefficient level derivation for a coefficient position may be performed earlier when required data are all available. For example, once an absolute value AbsLevel related to a transform coefficient level at a coefficient position within the sub-block is decoded (e.g. the absolute value AbsLevel is calculated after the syntax element abs_remainder or dec_abs_lvel is decoded) and state information associated with a state of dependent quantization at the coefficient position is recorded in the storage device 404 during the coefficient loop, the residual decoding circuit 402 updates the transform coefficient level TransCoeffLevel according to at least the absolute value AbsLevel related to the transform coefficient level at the coefficient position and the state information associated with the state of dependent quantization at the coefficient position. To put it simply, once the absolute value AbsLevel is calculated and the related state of dependent quantization is recorded at any stage, the residual decoding circuit 402 is allowed to start the transform coefficient level derivation.

Figure 7:
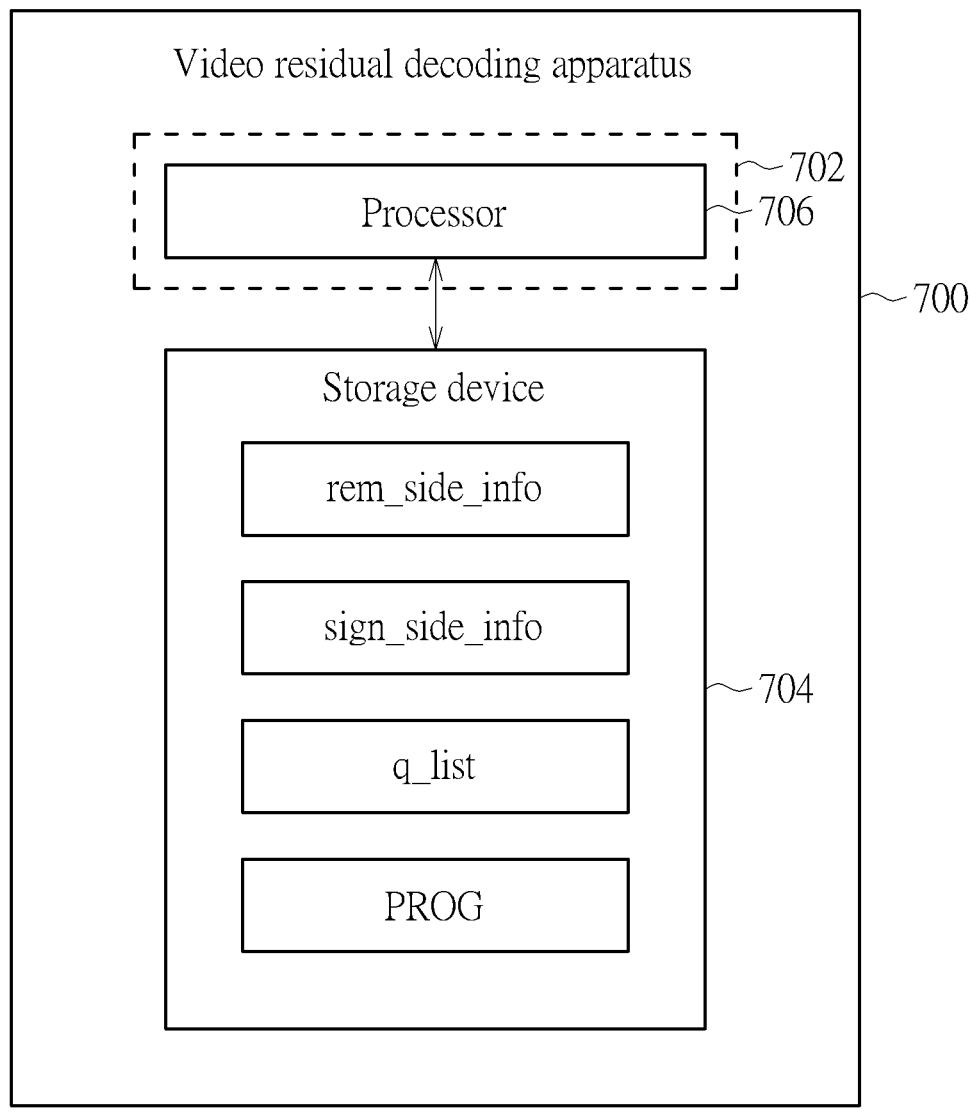
FIG. 7 is a diagram another video residual decoding apparatus according to an embodiment of the present invention.

Regarding the video residual decoding apparatus 400 shown in FIG. 4, the residual decoding circuit 402 may be implemented by pure hardware without software execution. However, this is for illustrative purposes only, and is not meant to be a limitation of the present invention. Alternatively, residual syntax decoding using at least one of the proposed optimization techniques may be performed by a program code loaded and executed by a processor. FIG. 7 is a diagram another video residual decoding apparatus according to an embodiment of the present invention. The video residual decoding apparatus 700 may be a part of a VVC/H.266 decoder. However, this is for illustrative purposes only, and is not meant to be a limitation of the present invention. In practice, any video decoder using at least one of the syntax decoding optimization techniques proposed by the present invention falls within the scope of the present invention. The video residual decoding apparatus 700 may include a residual decoding circuit 702 and a storage device 704. The major difference between the video residual decoding apparatuses 400 and 700 is that the residual decoding circuit 702 is realized by a processor 706 that loads a program code PROG from the storage device 704 and executes the program code PROG for dealing with the aforementioned residual syntax decoding of one transform block, where at least one of the proposed optimization techniques may be adopted. Since a person skilled in the pertinent art can readily understand details of the video residual decoding apparatus 700 after reading above paragraphs directed to the video residual decoding apparatus 400, similar description is omitted here for brevity.

Figure 8:
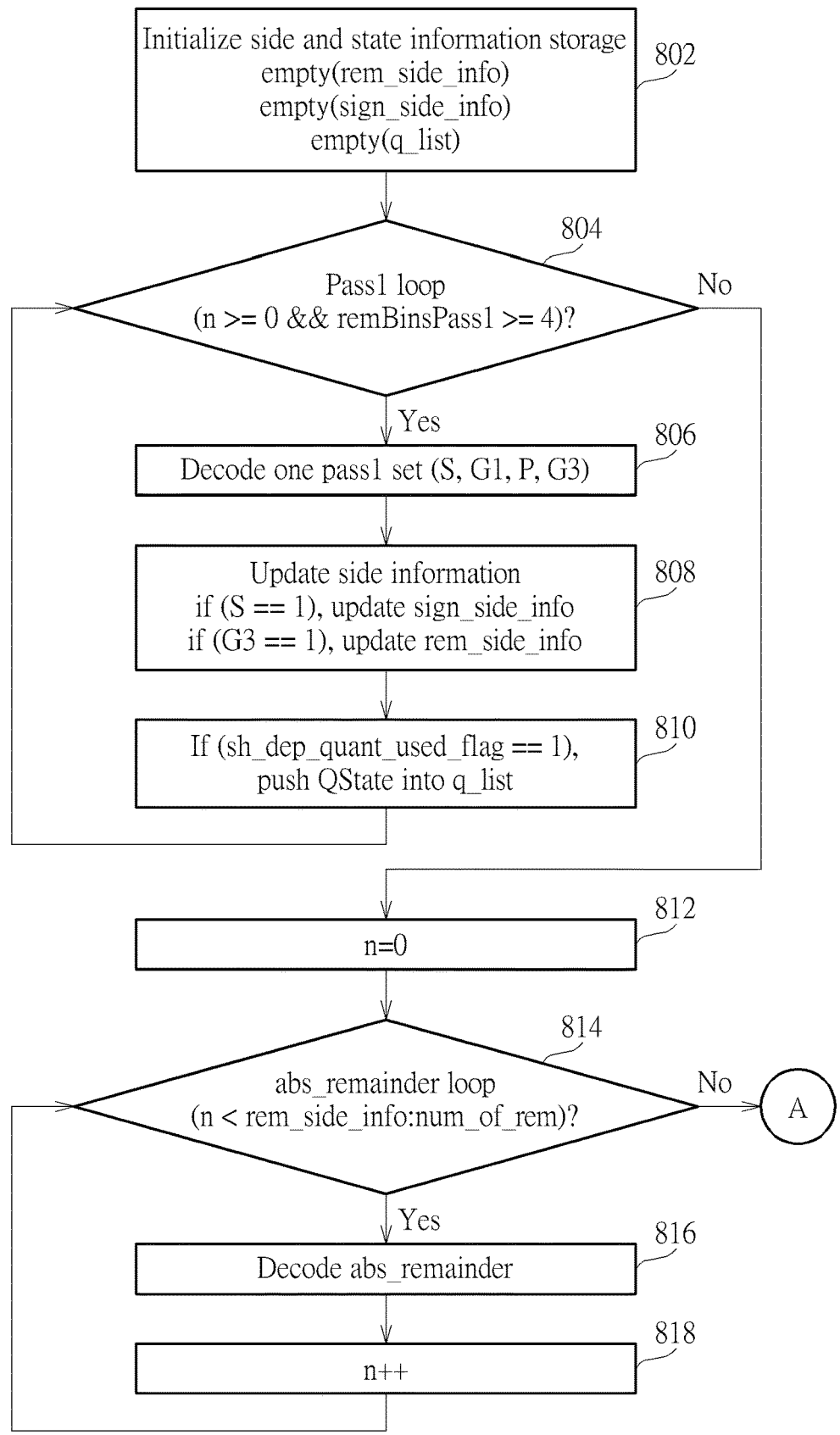
FIG. 8 is a flowchart illustrating a video residual decoding method according to an embodiment of the present invention.
Figure 9:
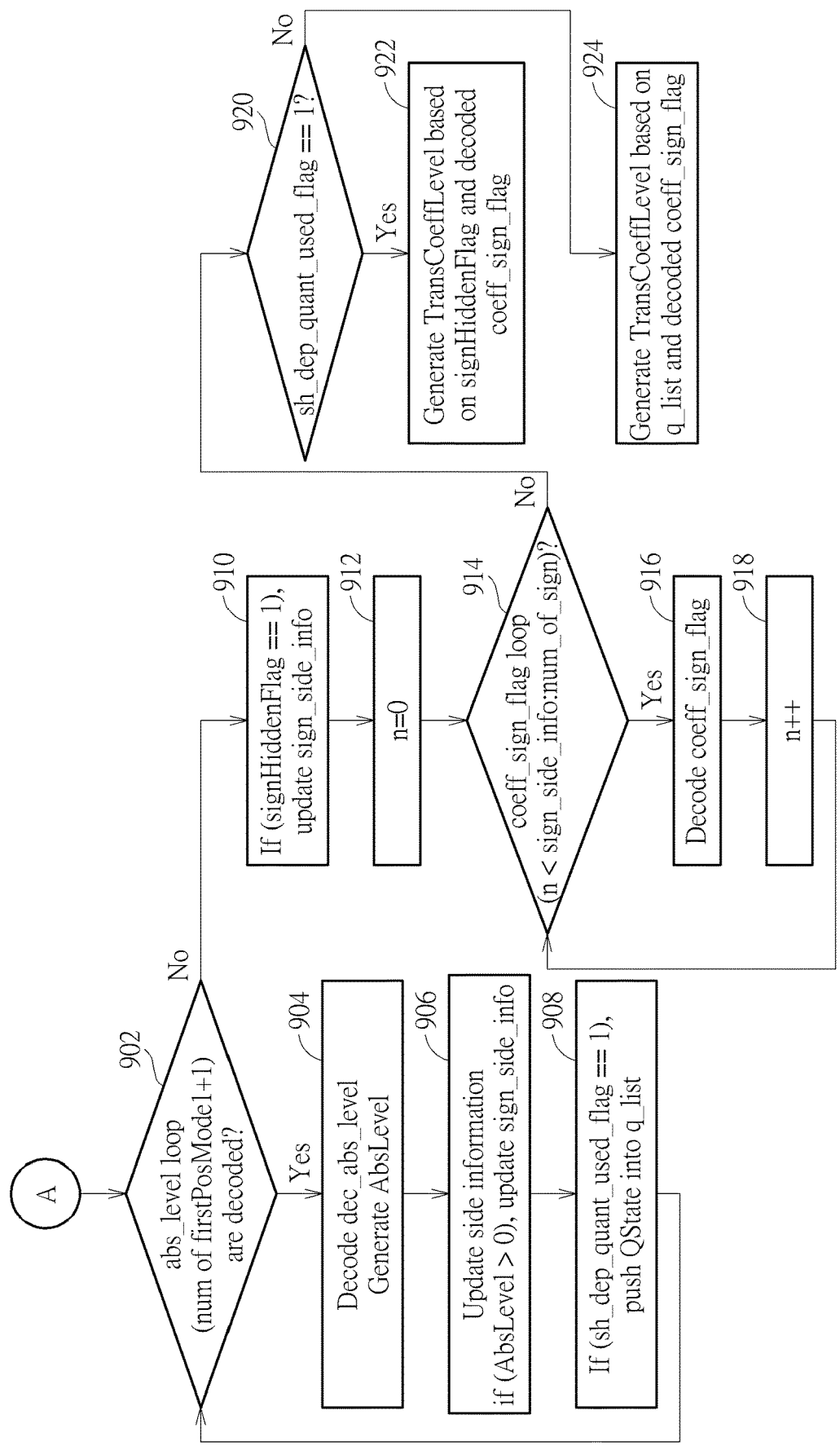
FIG. 9 is a continued flowchart of the video residual decoding method.

Please refer to FIG. 8 and FIG. 9. FIG. 8 is a flowchart illustrating a video residual decoding method according to an embodiment of the present invention. FIG. 9 is a continued flowchart of the video residual decoding method. The video residual decoding method may be employed by any of the video residual decoding apparatuses 400 and 700. Provided that the result is substantially the same, the steps are not required to be executed in the exact order shown in FIGS. 8-9. Steps 802, 808, 810, 812, 814, 818, 906, 908, 910, 912, 918, 922 are pertinent to the proposed syntax decoding optimization techniques, and are new to the conventional approach. For example, step 802 is performed to initialize an array used to record the side information and/or a list used to record the state information; steps 808, 906, 910 are performed to update the side information; steps 810 and 908 are performed to update the state information; steps 812, 814, and 818 are performed to achieve abs_remainder decoding with a reduced loop iteration number; steps 912, 914, and 918 are performed to achieve coeff_sign_flag decoding with a reduced loop iteration number; and step 922 is performed to achieve TransCoeffLevel derivation with reduced Qstate calculation. Steps 804, 806, 816, 902, 904, 916, 920 are the same as some steps used in the conventional approach. Since a person skilled in the art can readily understand details of steps 802, 808, 810, 812, 814, 818, 906, 908, 910, 912, 918, 922 after reading above paragraphs directed to the proposed syntax decoding optimization techniques, further description is omitted here for brevity.

In the above embodiments, VVC regular-mode residual decoding shown in FIG. 3 is used as an example for illustrating technical features of the proposed syntax element decoding optimization techniques. However, this is for illustrative purposes only, and is not meant to be a limitation of the present invention. The same concept may be extended to VVC TS-mode residual decoding or residual decoding of other video standards. These alternative designs all fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video residual decoding apparatus for applying residual decoding to a transform block that is divided into sub-blocks, comprising:
    a residual decoding circuit, arranged to enter a coefficient loop for decoding one or more syntax elements at each of coefficient positions within a sub-block that has at least one non-zero coefficient level, wherein the sub-block is included in the transform block, the coefficient loop comprises a plurality of decoding passes arranged to operate in sequence, the plurality of decoding passes comprise one decoding pass and at least one other decoding pass prior to said one decoding pass, and the residual decoding circuit does not enter the coefficient loop for decoding another sub-block included in the transform block before the plurality of decoding passes of the coefficient loop for decoding the sub-block included in the transform block are completed; and
    a storage device;
    wherein during said at least one other decoding pass, the residual decoding circuit is arranged to record side information in the storage device, where the side information is indicative of specific coefficient positions at which specific syntax elements need to be decoded in said one decoding pass; and
    wherein during said one decoding pass, the residual decoding circuit is arranged to refer to the side information recorded in the storage device for selecting the specific coefficient positions within the sub-block, and decoding the specific syntax elements at the specific coefficient positions, respectively.

2. The video residual decoding apparatus of claim 1, wherein the residual decoding circuit comprises a processor arranged to load and execute a program code for dealing with the residual decoding of the transform block.

3. The video residual decoding apparatus of claim 1, wherein each of the specific syntax elements indicates a remainder involved in decoding an absolute value of a transform coefficient level.

4. The video residual decoding apparatus of claim 3, wherein during said at least one other decoding pass, the residual decoding circuit is arranged to decode a syntax element at a coefficient position within the sub-block, where the syntax element indicates that an absolute value of a transform coefficient level at the coefficient position is greater than a predetermined value; and the storage device is arranged to record the coefficient position as one of the specific coefficient positions in the side information.

5. The video residual decoding apparatus of claim 3, wherein the side information is further indicative of a number of the specific syntax elements to be decoded in said one decoding pass.

6. The video residual decoding apparatus of claim 1, wherein each of the specific syntax elements indicates a sign of a transform coefficient level.

7. The video residual decoding apparatus of claim 6, wherein during said at least one other decoding pass, the residual decoding circuit is arranged to decode a syntax element at a coefficient position within the sub-block, where the syntax element indicates that a transform coefficient level at the coefficient position is a non-zero level; and the storage device is arranged to record the coefficient position as one of the specific coefficient positions in the side information.

8. The video residual decoding apparatus of claim 6, wherein during said at least one other decoding pass, the residual decoding circuit is arranged to decode a syntax element at a coefficient position within the sub-block, and refer to the syntax element to compute an absolute value related to a transform coefficient level at the coefficient position from, where the absolute value is a non-zero value; and the storage device is arranged to record the coefficient position as one of the specific coefficient positions in the side information.

9. The video residual decoding apparatus of claim 6, wherein the side information is further indicative of a number of the specific syntax elements to be decoded in said one decoding pass.

10. The video residual decoding apparatus of claim 9, wherein sign data hiding is utilized, and the residual decoding circuit is arranged to update the number of the specific syntax elements recorded in the storage device by the number of the specific syntax elements minus one.

11. A video residual decoding apparatus for applying residual decoding to a transform block that is divided into sub-blocks, comprising:
a residual decoding circuit, arranged to enter a coefficient loop for decoding one or more syntax elements at each of coefficient positions within a sub-block that has at least one non-zero coefficient level, wherein the sub-block is included in the transform block; and
a storage device;
wherein during the coefficient loop, the residual decoding circuit is arranged to record state information in the storage device, where the state information is associated with states of dependent quantization at coefficient positions within the sub-block; and
wherein the residual decoding circuit is arranged to refer to at least the state information recorded in the storage device for updating transform coefficient levels of the sub-block.

12. The video residual decoding apparatus of claim 11, wherein the residual decoding circuit comprises a processor arranged to load and execute a program code for dealing with the residual decoding of the transform block.

13. The video residual decoding apparatus of claim 11, wherein the state information records the states of dependent quantization at the coefficient positions within the sub-block.

14. The video residual decoding apparatus of claim 11, wherein each coefficient position at which a state of dependent quantization is larger than a predetermined value is indicated by the state information.

15. The video residual decoding apparatus of claim 11, wherein once an absolute value related to a transform coefficient level at a coefficient position within the sub-block is decoded and state information associated with a state of dependent quantization at the coefficient position is recorded in the storage device during the coefficient loop, the residual decoding circuit updates the transform coefficient level according to at least the absolute value related to the transform coefficient level at the coefficient position and the state information associated with the state of dependent quantization at the coefficient position.

16. The video residual decoding apparatus of claim 11, wherein during a level generation loop following the coefficient loop, the residual decoding circuit is arranged to update the transform coefficient levels of the sub-block according to at least the state information recorded in the storage device.

17. A video residual decoding method for applying residual decoding to a transform block that is divided into sub-blocks, comprising:
regarding a sub-block having at least one non-zero coefficient level, entering a coefficient loop for decoding one or more syntax elements at each of coefficient positions within the sub-block, wherein the sub-block is included in the transform block, the coefficient loop comprises a plurality of decoding passes that are arranged to operate in sequence, the plurality of decoding passes comprise one decoding pass and at least one other decoding pass prior to said one decoding pass, and the video residual decoding method does not enter the coefficient loop for decoding another sub-block included in the transform block before the plurality of decoding passes of the coefficient loop for decoding the sub-block included in the transform block are completed;
during said at least one other decoding pass, recording, by a storage device, side information indicative of specific coefficient positions at which specific syntax elements need to be decoded in said one decoding pass; and
during said one decoding pass, referring to the side information recorded in the storage device for selecting the specific coefficient positions within the sub-block, and decoding the specific syntax elements at the specific coefficient positions, respectively.

18. The video residual decoding method of claim 17, wherein each of the specific syntax elements indicates a remainder involved in decoding an absolute value of a transform coefficient level; or
each of the specific syntax elements indicates a sign of a transform coefficient level.

19. A video residual decoding method for applying residual decoding to a transform block that is divided into sub-blocks, comprising:
regarding a sub-block having at least one non-zero coefficient level, entering a coefficient loop for decoding one or more syntax elements at each of coefficient positions within the sub-block, wherein the sub-block is included in the transform block;

during the coefficient loop, recording, by a storage device, state information associated with states of dependent quantization at coefficient positions within the sub-block; and referring to at least the state information recorded in the storage device for updating transform coefficient levels of the sub-block.

20. The video residual decoding method of claim 19, wherein referring to at least the state information recorded in the storage device for updating transform coefficient levels of the sub-block comprises:

once an absolute value related to a transform coefficient level at a coefficient position within the sub-block is decoded and state information associated with a state of dependent quantization at the coefficient position is recorded in the storage device during the coefficient loop, updating the transform coefficient level according to at least the absolute value related to the transform coefficient level at the coefficient position and the state information associated with the state of dependent quantization at the coefficient position.

* * * * *